United States Patent Office 3,456,039
Patented July 15, 1969

3,456,039
PHOSPHORUS CARBONYL COMPOUNDS
Ernst Beriger, Allschwil, and Ludwig Ebner, Stein, Aargau, Switzerland, assignors to Ciba Limited, Basel, Switzerland, a company of Switzerland
No Drawing. Filed Dec. 7, 1965, Ser. No. 512,231
Claims priority, application Switzerland, Dec. 15, 1964, 16,212/64
Int. Cl. C07f 9/18, 9/28; A01n 9/36
U.S. Cl. 260—935    4 Claims

ABSTRACT OF THE DISCLOSURE

Phosphorus carbonyl compounds are provided which are represented by the formula

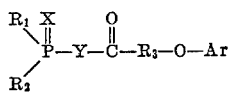

in which $R_1$ and $R_2$ are the same or different and each represents an alkyl or aryl group which is bound directly to the phosphorus atom or through an oxygen or sulphur atom, X represents an oxygen or sulphur atom, Y is oxygen or sulphur or a single bond, $R_3$ is a linear or branched alkylene group of 1 to 3 carbon atoms, and Ar represents phenyl and phenyl substituted by one or more substituents such as halogen, lower alkyl, lower alkoxy, nitro, —$CF_3$, CN, formyl and alkoxycarbonyl radicals.

---

The phosphorus compounds of this invention are especially useful as insecticides, ovicides, acaricides, molluscicides, nematocides, and are effective against plant-pathogenic fungi, and in particular are herbicidal and desiccating at certain concentrations.

The present invention provides phosphorus carbonyl compounds of general formula

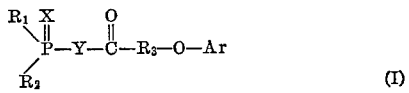

in which $R_1$ and $R_2$ each represent an alkyl or aryl group which may be the same or different and may be bound to the phosphorus atom through oxygen or sulphur, X represents an oxygen or sulphur atom, Y represents an oxygen or sulphur atom or the direct P–C bond, $R_3$ represents a linear or branched alkylene group of 1 to 3 carbon atoms, and Ar represents a phenyl group, which may be substituted by one or more substituents selected from halogen atoms, lower alkyl groups, lower alkoxy groups, nitro groups, —$CF_3$, CN, formyl and alkoxycarbonyl groups.

The phosphorus compounds of the general Formula I are insecticidal, ovicidal, acaricidal, molluscicidal, nematocidal, effective against plant-pathogenic fungi, and in particular are herbicidal and desiccating at certain concentrations.

The present invention therefore also provides preparations for combating pests and undesired plant growth which contain at least one phosphorus carbonyl compound of general Formula I, and a liquid or solid carrier, for example, at least one of the following additives: solvents, diluents, dispersing agents, wetting agents, adhesives, fertilisers, and other pesticides.

The present invention further provides a method of treating a crop area which comprises treating the area with a phosphorus carbonyl compound of the general Formula I.

Because of their broad range of biocidal action the new materials have the particular advantage that very different types of vegetable and animal pests may be combatted.

They are not only suitable for use as herbicides but also show, if used at a concentration which does not permit any phytotoxic phenomena to arise, outstanding effectiveness against harmful micro-organisms in plant protection, for example, against fungi such, for example, as *Alternaria solani, Phytopthora infestans* and *Septoria apii*, as well as against harmful insects, acarids, nematodes and their eggs or larvae. The powerful nematocidal effect of the new phosphorus carbonyl compounds of Formula I is surprising.

The type of herbicidal effect does not resemble that of the comparable substances from the 2,4–D series (2,4-dichlorophenoxyacetic acid), but more nearly that of the series of 2,4-dichlorophenoxyethanol derivatives.

Thus the new phosphorus carbonyl compounds of the invention can be used in the treatment of cultures of certain food plants such, for example, as strawberries, vines and various vegetables, whereas this is impossible with 2,4–D or its salts.

The phosphorus carbonyl compounds of the Formula I are especially suitable for use as herbicides for the selective combating of dicotyledon weeds in grain and other monocotyledon cultures.

Furthermore the new materials may be used generally as microbiocides, for example, against Aspergillus types, as well as insecticides, for example, against midges and flies.

As materials which may be used for the preparation of directly sprayable solutions of compounds of general Formula I there may be mentioned, for example, mineral oil fractions of high to medium boiling range, such, for example, as diesel oil or kerosene, coal tar oil and vegetable or animal oils, as well as hydrocarbons such, for example, as alkylated naphthalenes or tetrahydronaphthalenes, optionally together with the use of xylene mixtures, cyclohexanols, ketones, and furthermore chlorinated hydrocarbons such, for example, as trichlorethane, tetrachlorethane, trichlorethylene or tri- and tetrachlorobenzenes. There may be used with advantage organic solvents of boiling point above 100° C.

Preparations for aqueous application are wtih particular advantage prepared from emulsion concentrates, pastes or wettable spraying powders, by the addition of water.

As emulsifying or dispersing agents there may be mentioned non-ionic products, for example, condensation products of aliphatic alcohols, amines or carboxylic acids having a long-chain hydrocarbon group of about 10 to 20 carbon atoms, with ethylene oxide such, for example, as the condensation product of octadecyl alcohol and 25 to 30 mols of ethylene oxide, or that of soya fat acid and 30 mols of ethylene oxide or that of commercial oleylamine and 15 mols of ethylene oxide or that of dodecylmercaptan and 12 mols of ethylene oxide. Amongst anionic emulsifiers which may be used, the following may be mentioned: the sodium salt of the dodecyl alcohol sulphate ester, sodium dodecylbenzenesulphonate, potassium or triethanolamine oleate or abietate, or the potassium or triethanolamine salts or mixtures of these acids, or the sodium salt of a petroleum sulphonic acid. Possible cationic dispersing agents are quaternary ammonium compounds such, for example, as cetylpyridinium bromide, or dioxyethylbenzyldodecyl ammonium chloride.

In the preparation of scattering and dusting agents, talc, kaolin, bentonite, calcium carbonate, calcium phosphate, and also coal, cork flour, wood flour and other materials of vegetable origin may be used as the solid carriers. The production of the preparations in a granular form is also very appropriate. The various forms in which the material is applied may contain, in the usual way, additives which improve the distribution, adhesion, resistance to rain or penetrating power. Fatty acids, resin, glue, casein or alginates may be mentioned as such materials.

The compounds and preparations of the invention may be used by themselves or together with conventional pesticides, particularly insecticides, acaricides, nematocides, bactericides or other fungicides or herbicides.

The present invention also provides the following processes for the preparation of the phosphorus carbonyl compounds of the general Formula I.

In the case where Y denotes oxygen or sulphur, the process comprises reacting a compound of the formula

(II)

with a compound of the formula

(III)

in which formulae one of the groups Z or V denotes the radical —OMe or —SMe, and the other denotes a halogen atom, Me representing a metallic ion (including ammonium), preferably an alkali metal ion.

According to this process one may thus proceed by reacting a phosphoric acid halide of Formula II (Z denotes halogen) with a salt of a carboxylic acid of Formula III or with a thiol analogue thereof. (V denotes OMe or SMe) or, alternatively, causing a salt of a phosphoric or thiol-phosphoric acid of Formula II (Z denotes OMe or SMe) to react with a carboxylic acid halide of Formula III (V denotes halogen).

The reaction is preferably carried out in an inert solvent as, for example, dioxane or acetonitrile.

In the case where Y denotes the direct phosphorus to carbon bond, the process for the manufacture of the phosphorus carbonyl compounds of the general Formula I comprises subjecting a compound of the formula

(IV)

in which at least R' denotes a low-molecular alkoxy or alkylthio group, together with a compound of the formula

(V)

to the Arbuzov reaction or, alternative, the process comprises reacting a compound of the formula

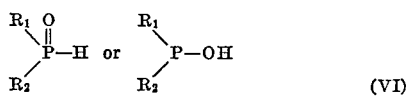
(VI)

with a compound of the Formula V in the presence of an alkali.

In the reaction schemes given above, Me denotes a metal ion, preferably an alkali metal ion, including an ammonium ion, and Hal denotes a halogen atom, preferably chlorine or bromine. The following may be used as phenoxyalkane carboxylic acids or their halides: phenoxyacetic acid, α-phenoxypropionic acid, β-phenoxypropionic acid, α-phenoxybutyric acid, β-phenoxybutyric acid, γ-phenoxybutyric acid.

The phenyl nucleus of these acids may, for example, be unsubstituted, or may on the other hand contain, for example, the following substituents: 4-chloro, 2,4-dichloro, 2,4-dibromo, 2-methyl-4-chloro, 4-chloro-3-trifluoromethyl, 4-chloro-2-methoxy, 4-nitro, 4-formyl, 4-carbomethoxy, 4-carboethoxy or 2,4,5-trichloro.

The salts or halides of the following esters may, for example, be used as the phosphoric acid components: O,O-dimethyl-thiophosphoric acid, O,O-dimethyl-dithiophosphoric acid; O-methyl-O-isopropyl-dithiophosphoric acid; O,O-dimethylphosphoric acid; O,O-diethylphosphoric acid or its mono- or dithio-derivatives; O,O-dipropylphosphoric acid, or its mono- or dithio-derivatives; O,O-diphenylphosphoric acid or its mono- or dithio-derivatives; O,O-di-p-chlorophenylphosphoric acid or its mono- or dithio-derivatives; O,O-di-2,4-dichlorophenylphosphoric acid or its mono- or dithio-derivatives.

Amongst phosphonic acids there may be used methylphosphonic acid, ethylphosphonic acid, propylphosphonic acid or phenylphosphonic acid.

The following phosphites and phosphonites may, for example, be used for the reaction (c.f. Formula IV): trimethylphosphite, triethylphosphite, triisopropylphosphite, tributylphosphite, methyl - O,O - dimethylphosphonite, phenyl - O,O-dimethylphosphonite, 4 - chlorophenyl-O,O-dimethylphosphonite, 4-chloro - phenyl-O,O-diethylphosphonite, dimethylphosphite, diethylphosphite, or dipropylphosphite.

The phosphorus carbonyl compounds obtained are generally viscous oils which dissolve very slightly in water but are easily soluble in acetone. They cannot be distilled in a high vacuum without decomposition.

The following examples illustrate the invention, the parts being by weight unless otherwise stated and the relationship of parts by weight to parts by volume being the same as that of the kilogram to the litre. Unless otherwise stated the temperatures are in degrees centigrade.

EXAMPLE 1

18 parts of sodium dimethyldithiophosphate are introduced into 100 parts by volume of acetonitrile and treated with 24 parts of 2,4-dichlorophenoxyacetyl chloride in 10 parts by volume of acetonitrile at 10–20° C. over the course of 15 minutes, with ice cooling. Stirring is continued overnight at room temperature, 100 parts by volume of methylene chloride are then added, and the salts washed out with 50 parts of water. A small amount of acid components are washed out with 20 parts by volume of saturated sodium bicarbonate solution. The solution is then dried over sodium sulphate and the solvent evaporated in vacuo at 40–50° C. bath temperature. The residue obtained consists of 29 parts of the condensation product in the form of a yellow viscous oil.

The condensation product so obtained has the following constitution:

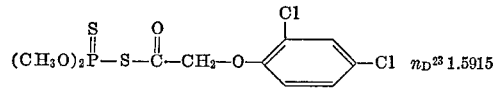

EXAMPLE 2

24 parts of 2,4-dichlorophenoxyacetyl chloride are heated to 60–70° C. in 50 parts by volume of dry benzene. 18.2 parts of triethyl phosphite are added dropwise to this over the course of 15 minutes. An exothermic reaction takes place, with elimination of ethyl chloride. The mixture is maintained boiling under reflux for a further 1 hour, the easily volatile components are then removed in vacuo, and under a high vacuum at 80° C. bath temperature, and 36 parts of a pale yellow clear oil, which solidifies to a waxy material on standing, are obtained as the residue.

The condensation product so obtained has the following constitution:

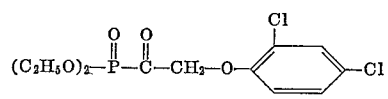

The following phosphorus carbonyl compounds may be prepared in the same manner as described in the above examples:

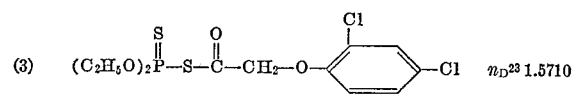

(4) $(CH_3O)_2\overset{O}{\underset{\|}{P}}-\overset{O}{\underset{\|}{C}}-CH_2-O-C_6H_3(Cl)_2$ — Waxy mass (5) $(C_4H_9O)_2\overset{O}{\underset{\|}{P}}-\overset{O}{\underset{\|}{C}}-CH_2-O-C_6H_3(Cl)_2$ — $n_D^{23}$ 1.4981

(6) $(CH_3O)_2\overset{S}{\underset{\|}{P}}-S-\overset{O}{\underset{\|}{C}}-CH(CH_3)-O-C_6H_5$ — Jellylike mass (7) $(C_2H_5O)_2\overset{S}{\underset{\|}{P}}-S-\overset{O}{\underset{\|}{C}}-CH(CH_3)-O-C_6H_5$ — $n_D^{22}$ 1.5475

(8) $(CH_3O)_2\overset{O}{\underset{\|}{P}}-\overset{O}{\underset{\|}{C}}-CH(CH_3)-O-C_6H_5$ — $n_D^{22}$ 1.4942

(9) $(C_2H_5O)_2\overset{O}{\underset{\|}{P}}-\overset{O}{\underset{\|}{C}}-CH(CH_3)-O-C_6H_5$ — $n_D^{23}$ 1.4851

(10) $(C_4H_9O)_2\overset{O}{\underset{\|}{P}}-\overset{O}{\underset{\|}{C}}-CH(CH_3)-O-C_6H_5$ — $n_D^{22}$ 1.4813

(11) $(CH_3O)_2\overset{S}{\underset{\|}{P}}-S-\overset{O}{\underset{\|}{C}}-CH_2-O-C_6H_4-Cl$ — M.P. 53–54°

(12) $(C_2H_5O)_2\overset{S}{\underset{\|}{P}}-S-\overset{O}{\underset{\|}{C}}-CH_2-O-C_6H_4-Cl$ — $n_D^{22}$ 1.5644

(13) $(CH_3O)_2\overset{O}{\underset{\|}{P}}-\overset{O}{\underset{\|}{C}}-CH_2-O-C_6H_4-Cl$ — $n_D^{23}$ 1.5090

(14) $(C_2H_5O)_2\overset{O}{\underset{\|}{P}}-\overset{O}{\underset{\|}{C}}-CH_2-O-C_6H_4-Cl$ — $n_D^{23}$ 1.5034

(15) $(C_4H_9O)_2\overset{O}{\underset{\|}{P}}-\overset{O}{\underset{\|}{C}}-CH_2-O-C_6H_4-Cl$ — $n_D^{22}$ 1.4925

(16) $(CH_3O)_2\overset{S}{\underset{\|}{P}}-S-\overset{O}{\underset{\|}{C}}-CH_2-O-C_6H_5$ — $n_D^{23}$ 1.572

(17) $(C_2H_5O)_2\overset{S}{\underset{\|}{P}}-S-\overset{O}{\underset{\|}{C}}-CH_2O-C_6H_5$ — $n_D^{22}$ 1.5580

(18) $(CH_3O)_2\overset{O}{\underset{\|}{P}}-\overset{O}{\underset{\|}{C}}-CH_2-O-C_6H_5$ — $n_D^{23}$ 1.5025

(19) $(C_2H_5O)_2\overset{O}{\underset{\|}{P}}-\overset{O}{\underset{\|}{C}}-CH_2-O-C_6H_5$ — $n_D^{23}$ 1.4955

(20) $(C_4H_9O)_2\overset{O}{\underset{\|}{P}}-\overset{O}{\underset{\|}{C}}-CH_2-O-C_6H_5$ — $n_D^{23}$ 1.4826

(21) $(CH_3O)_2\overset{S}{\underset{\|}{P}}-S-\overset{O}{\underset{\|}{C}}-CH_2-O-C_6H_3(CH_3)-Cl$ — Waxy mass

(22) $(C_2H_5O)_2\overset{S}{\underset{\|}{P}}-S-\overset{O}{\underset{\|}{C}}-CH_2-O-C_6H_3(CH_3)-Cl$ — $n_D^{23}$ 1.5610

(23) $(CH_3O)_2\overset{O}{\underset{\|}{P}}-\overset{O}{\underset{\|}{C}}-CH_2-O-C_6H_3(CH_3)-Cl$ — $n_D^{23}$ 1.5093

(24) $(C_2H_5O)_2\overset{O}{\underset{\|}{P}}-\overset{O}{\underset{\|}{C}}-CH_2-O-C_6H_3(CH_3)-Cl$ — $n_D^{23}$ 1.5036

(25) $(C_4H_9O)_2\overset{O}{\underset{\|}{P}}-\overset{O}{\underset{\|}{C}}-CH_2-O-C_6H_3(CH_3)-Cl$ — $n_D^{23}$ 1.4908

(26) $C_6H_5-\underset{OCH_3}{\overset{O}{\underset{\|}{P}}}-\overset{O}{\underset{\|}{C}}-CH_2-O-C_6H_3(Cl)_2$ — Waxy mass

(27) $C_6H_5-\underset{OCH_3}{\overset{O}{\underset{\|}{P}}}-\overset{O}{\underset{\|}{C}}-CH_2-O-C_6H_3(CH_3)-Cl$ — $n_D^{24}$ 1.5685

(28) $(CH_3)_2CHO\overset{S}{\underset{\|}{\underset{CH_3O}{P}}}-S-\overset{O}{\underset{\|}{C}}-O-C_6H_3(Cl)_2$ — $n_D^{24}$ 1.5712

(29) $(C_3H_7O)_2\overset{S}{\underset{\|}{P}}-S-\overset{O}{\underset{\|}{C}}-CH_2O-C_6H_3(CH_3)-Cl$ — $n_D^{24}$ 1.5522

(30) $(C_4H_9O)_2\overset{S}{\underset{\|}{P}}-S-\overset{O}{\underset{\|}{C}}-CH_2-O-C_6H_3(CH_3)-Cl$ — $n_D^{24}$ 1.5440

(31) $(C_2H_5O)_2\overset{O}{\underset{\|}{P}}-\overset{O}{\underset{\|}{C}}-CH_2-O-C_6H_4-NO_2$ — $n_D^{24}$ 1.5188

(32) $(C_2H_5O)_2\overset{O}{\underset{\|}{P}}-\overset{O}{\underset{\|}{C}}-CH_2-O-C_6H_3(OCH_3)-Cl$ — $n_D^{20}$ 1.5092

The intermediate product $Cl-C_6H_3(OCH_3)-OCH_2COCl$ is obtained in the usual manner by condensation of $Cl-C_6H_3(OCH_3)-ONa$ with chloroacetic acid and subsequent treatment of the condensation product with thionyl chloride. M.P. 51–53°.

EXAMPLE 33

$(C_2H_5O)_2\overset{O}{\underset{\|}{P}}-\overset{O}{\underset{\|}{C}}-CH_2-O-C_6H_3(COOCH_3)-Br$ — $n_D^{20}$ 1.5488

The intermediate product $Br-C_6H_3(COOCH_3)-OCH_2COCl$ is obtained in the usual manner by condensation of $Br-C_6H_3(COOCH_3)-ONa$ with chloroacetic acid and subsequent treatment of the condensation product with thionyl chloride ($n_D^{24}$ 1.6208).

EXAMPLE 34

$(C_2H_5O)_2\overset{O}{\underset{\|}{P}}-\overset{O}{\underset{\|}{C}}-CH_2-O-C_6H_4-CF_3$ — $n_D^{20}$ 1.4611

The interemdiate product

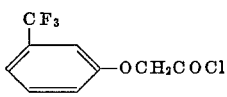

is obtained in the usual manner by condensation of

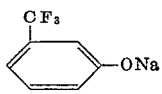

with chloroacetic acid and subsequent treatment of the condensation product with thionyl chloride (B.P.$_{0.18}$82°)

EXAMPLE 35

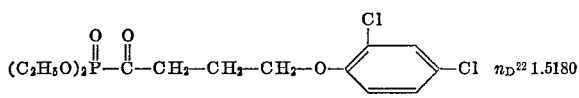

The intermediate product

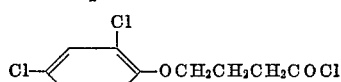

is obtained in the usual manner by treating 2,4-dichlorophenoxybutyric acid with thionyl chloride (B.P.$_{15}$183°)

EXAMPLE 36

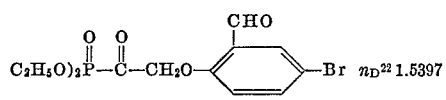

The intermediate product

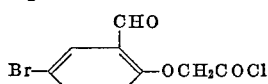

is obtained in the usual manner by condensation of

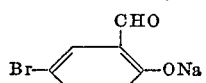

with chloroacetic acid and subsequent treatment of the condensation product with thionyl chloride ($n_D^{24}$ 1.6042)

EXAMPLE 37

2.3 parts of sodium are introduced in small slices into 150 parts by volume of dry benzene and treated at 20–30° with 20 parts of dibutyl phosphite. The mixture is stirred overnight until all the sodium has dissolved, and a solution of 27.4 parts of 2,4,5-trichlorophenoxyacetyl chloride (B.P.$_{20}$178°) in 30 parts by volume of benzene are added dropwise. The reaction mixture is stirred for a further 24 hours at 30–40°. After cooling the mixture is washed successively with water and with saturated sodium bicarbonate solution, and after drying over sodium sulphate and evaporation of the solution in vacuo at 80°, 37 parts of condensation product of formula

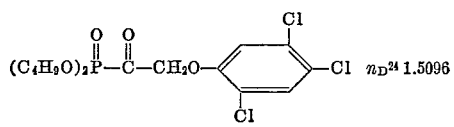

are obtained as the residue.

EXAMPLE 38

40.1 parts of 4-chloro-2-methylphenoxyacetic acid are treated with a solution of 4.6 parts of sodium and 80 parts by volume of methanol. The sodium salt is evaporated to dryness and then mixed to a sludge with 200 parts by volume of acetonitrile. After adding 1 part of copper powdery, the mixture is heated to 60° and 37.7 parts of diethyl-thiochlorophosphate added dropwise over the course of 15 minutes. The mixture is maintained at the boil for 8 hours, and the precipitated salts then removed by filtration. The solution is evaporated at 50°. The residue is taken up in 100 parts by volume of methylene chlorine and washed until neutral by means of 4 portions of saturated sodium bicarbonate solution each consisting of 20 parts by volume. After drying over sodium sulphate, the solution is evaporated in vacuo at 40–50° and finally in a high vacuum at 90°. The residue obtained consists of 43 parts of the condensation product of formula

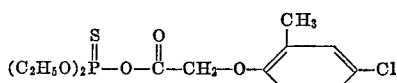

in the form of a dark red oil.

EXAMPLE 39

20 grams of the active material described in Example 1 is dissolved in a little xylene together with 20 grams of an emulsifier, and the solution made up to 100 ccs. with xylene. This solution is the concentrate for the preparation of spray solutions.

The emulsifier used may, for example, be a mixture of anionic and cationic as well as non-ionic emulsifiers as is, for example, commercially available under the trade name Toximul Q.

The compounds described in the subsequent Examples 2–38 may be formulated in the same way.

EXAMPLE 40

10 grams of the phosphorus compound described in Example 4 is dissolved in 100 grams of acetone and 80 grams of an emulsifier consisting of the condensation product of 1 mol of para-di-tertiary octylphenol with 8 mols of ethylene oxide are added to this solution. The solution so obtained may be diluted with water to any desired extent, for example, to concentrations of 100 and 25 parts per million.

EXAMPLE 41

The active substances of Examples 1, 2 and 4, formulated as in Example 39, were examined in field tests at concentrations of 3 kilograms of active substance/hectare. The pre-emergent treatment (a) took place 1 day after sowing, and the post-emergent treatment (b) when the cultivated plants and weeds had reached the 2–4 leaf stage.

The following cultivated plants were tested: peas, sorghum, peanuts, cotton, soya beans, rice, tomatoes, marrow, maize and oats.

Evaluation was carried out 4 weeks after treatment. The following table contains the results of the experiments:

| Stage | Preparation | Oats | Maize | Marrow | Tomatoes | Rice | Soya beans | Cotton | Peanuts | Sorghum | Peas | Effect on weeds |
|---|---|---|---|---|---|---|---|---|---|---|---|---|
| (a) | Ex. 1 | | 0–1 | 4–5 | 6–10 | 9 | 2–3 | 3–5 | 0–4 | 2–6 | 5–6 | 8–9 |
| (b) | Ex. 1 | 0 | 0 | 10 | 10 | 5 | 9–10 | 9–10 | 3–7 | 0–5 | 10 | 9–10 |
| (a) | Ex. 2 | | 0 | 0–1 | 5–8 | 10 | 0–4 | 0–2 | 0–5 | 2 | 0–2 | 3–8 |
| (b) | Ex. 2 | 0 | 0–6 | 4–7 | 10 | 3 | 6–10 | 8 | 3–4 | 9 | 4–10 | 9–10 |
| (a) | Ex. 4 | | 0 | 4 | 3 | 3 | 2 | 2 | 0 | 0 | 0 | 10 |
| (b) | Ex. 4 | 0 | 10 | 10 | 10 | 1 | 10 | 9 | 9 | 5 | 10 | 10 |

Legend:
0 = no effect or good compatibility.
10 = total damage, 100% herbicidal effect.

Effect on weeds: the figure here quoted represents a mean value of the results for the following weeds: *Mollugo verticillato, Chenopodium album, Amaranthus retr., Solanum nigrum, Ambrossia artemisiaefolia, Brassica keber, Setaria glunca, Digitaria sangn., Eleusine indicia.*

EXAMPLE 42

Preparations of Examples 1 and 2 were field tested at 3 kilograms and 6 kilograms of active substance per hectare for maize, summer wheat and winter wheat.

Treatment: post-emergent at the 3–4 leaf stage of the maize and during the period when wheat develops stocky stems, and at the stage of small to large rosettes in the case of weeds.

Evaluation was carried out after 4 weeks in the case of wheat and after 7 weeks in the case of maize.

The following table contains the results of the experiments:

Weeds.—(1) Sinapsis, (2) Galeopsis, (3) Polygonum spp., (4) Stellaria, (5) Capsella, (6) Spergula, (7) Chenopodium, (8) Polygonum conv., (9) Fumaria, (10) Senecio, (11) Sonchus, (12) Lamium, (13) Viola.

| Preparation—(kilograms of active substance/hectare) | Winter Wheat | Summer Wheat | Maize | Weeds |
|---|---|---|---|---|
| Compound of Example 1—(3) | 1(2) | 2 | 3 | 9 |
| Compound of Example 1—(6) | 1(2) | 1(2) | 3 | 8–9 |
| Compound of Example 2—(3) | 1 | 1(2) | | 6 |
| Compound of Example 2—(6) | 2 | 1(2) | | 6–7 |

1=100% compatible.  10=100% effect on weeds.

EXAMPLE 43

The following types of plants were sown in pots in order to test the plant-destroying effect of the compounds of Examples 2 and 1, formulated as in Example 39: Phaseolus, Medicago, Lactuca, Daucus, Brassica, Linum, Calendula, Beta, Allium, Hordeum, Triticum, Poa.

Pre-emergent effect

Treatments were carried out one day after sowing and evaluation 21 days after treatment.

Post-emergent effect

Treatment was carried out 12 days after sowing, in the cotyledon or first leaf stage of the various types. Evaluation was carried out 18 days after treatment. The amount used corresponded to 5.0 kilograms of the active substance described in Example 2 and 4.0 kilograms of the active material described in Example 1 respectively. The results are summarised in the following table (assessment: 0=no effect, as in control experiment; 10=plants completely killed).

| Type of Plant | Active Substance as in Example 2 | | Active Substance as in Example 1 | |
|---|---|---|---|---|
| | Pre-emergent | Post-emergent | Pre-emergent | Post-emergent |
| Phaseolus | 6 | 10 | 2 | 10 |
| Medicago | 10 | 10 | 9 | 10 |
| Lactuca | 7 | 10 | 10 | 10 |
| Daucus | 10 | 9 | 10 | 10 |
| Brassica | 10 | 10 | 8 | 10 |
| Linum | 5 | 10 | 3 | 10 |
| Calendula | 4 | 10 | 1 | 10 |
| Beta | 9 | 10 | 6 | 10 |
| Allium | 8 | 8 | 7 | 9 |
| Hordeum | 3 | 2 | 1 | 1 |
| Triticum | 0 | 2 | 1 | 1 |
| Poa | 4 | 3 | 5 | 1 |

The active substances of the invention corresponding to Examples 1 and 2 exert a particularly strong effect, in the post-emergent application process, on numerous dicotyledonous types of plants, whereas the effect on barley (Hordeum) and wheat (Triticum) is only faint. The active substances referred to are thus especially suited to use as herbicides for the selective combating of dicotyledonous weeds in grain and other monocotyledon cultures.

EXAMPLE 44

The compound of Example 4 shows good nematocidal effects. It was formulated as in Example 40 and tested for its nematocidal effect at concentrations of 25 and 100 parts per million, in comparison with the mixture of dichloropropane/dichloropropene commercially available under the name D–D.

| | Percent Mortality for *Pangrellus redivivus* | |
|---|---|---|
| | 25 parts per million | 100 parts per million |
| Compound of Example 4 | 38 | 93 |
| D–D | 29 | 79 |

EXAMPLE 45

The compound of Example 4 was formulated according to Example 39. On spraying *Aphis fabae* on vicia faba with 0.08% of active substance, from all sides, the greenfly were all killed.

EXAMPLE 46

On spraying *Tetranychus urticae* on Phaseolus beans from all sides with 0.08% active substance of compound 4, all post-embryonic stages of the "spinning mites" were completely killed. The larvae which hatch within the observation period of 7 days after spraying, were also completely killed because of the persistence of the active substance.

EXAMPLE 47

On carrying out the dish test with an acetone solution of the compound of Example 31, the latter proved 100% effective against *Musca domestica* at concentrations of 10 mg./dish after 8 hours exposure.

In a bait test, the same compound proved 100% effective even at concentrations of as low as 300 parts per million.

EXAMPLE 48

Adult ticks (*Rhipicephalus bursa*) were immersed for 2 minutes in a xylene/water emulsion of the compound of formula

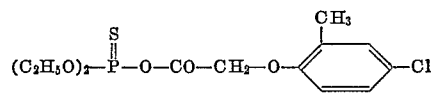

(concentration of active substance, 1 part per million) and transferred to a clean glass vessel. The effect was examined after 1 week, when it was found that all the ticks had been destroyed.

EXAMPLE 49

Eggs of *Ephestia kuhniella* were wetted with a xylene/water emulsion of the substance of Example 38. 100% effectiveness could still be observed at a concentration of 60 parts per million.

EXAMPLE 50

Cotton plants were treated in the half-open seed capsule stage with compound 1 formulated as in Example 39. The desiccant effect was determined after 7 days:

| Percent Active Substance | 0.5 | 0.2 | 0.1 |
|---|---|---|---|
| Effectiveness: | | | |
| Example 1 | 100 | 100 | 90 |
| PREP: | 100 | 100 | 80 |

NOTE.—PREP is the commercially available sodium cis-3-chloroacrylate.

What is claimed is:

1. Phosphrous carbonyl compounds of the formula

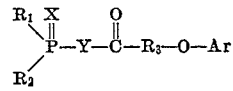

in which $R_1$ and $R_2$ each represent alkyl having 1–4 carbon atoms or phenyl, which may be the same or different and at least one of which is bound to the phosphorus atom through an oxygen atom, X represents oxygen or sulphur, Y represents oxygen or sulphur, $R_3$ represents a linear or branched alkylene radical of 1 to 3 carbon atoms, and Ar represents a phenyl group which may contain one or more substituents selected from chlorine, bromine, lower alkyl, lower alkoxy, nitro, $CF_3$, formyl and lower alkoxycarbonyl groups.

2. The compound of the formula

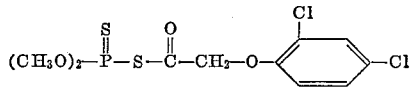

3. The compound according to claim 1 of the formula

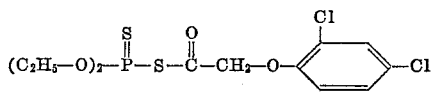

4. The compound according to claim 1 of the formula

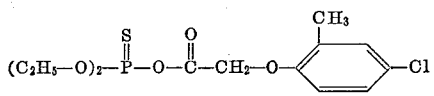

References Cited

UNITED STATES PATENTS

| | | | |
|---|---|---|---|
| 3,234,305 | 2/1966 | Malz et al. | 260—928 |
| 3,009,940 | 11/1961 | Tilles | 260—935 |
| 2,956,919 | 10/1960 | Baker et al. | 260—969 XR |
| 2,719,167 | 9/1955 | Schmidt. | |
| 3,382,060 | 5/1968 | Gier | 260—941 XR |

CHARLES B. PARKER, Primary Examiner

A. H. SUTTO, Assistant Examiner

U.S. Cl. X.R.

71—71, 86, 87; 260—941, 969, 971, 978; 424—212